UNITED STATES PATENT OFFICE 2,037,389

NITRILES OF HIGHER UNSATURATED FATTY ACIDS AND A PROCESS OF PREPARING THEM

Otto Nicodemus, Frankfort-on-the-Main-Hochst, and Otto Wulff, Konigstein, Germany, assignors to I. G. Farbenindustrie Aktiengesellschaft, Frankfort-on-the-Main, Germany No Drawing. Application February 8, 1934, Serial No. 710,368. In Germany February 3, 1932

8 Claims. (Cl. 260—99.30)

The present invention relates to nitriles of higher unsaturated fatty acids and to a process of preparing them.

We have found that nitriles of higher unsaturated fatty acids can be obtained in a very good yield by causing saturated or unsaturated hydroxy fatty acids containing more than 10 carbon atoms or the esters thereof, that is organic compounds of the general formula:

$$(R-COO)_x-R_1$$

wherein $x$ stands for the figure 1 or a multiple thereof, R stands for a hydroxylated aliphatic radical of at least ten carbon atoms and $R_1$ stands for hydrogen or an aliphatic radical in case of $x$ being figure 1 or $R_1$ standing for the residue of a polyvalent aliphatic alcohol, x-hydroxyl groups of which being substituted by the acid residue R—COO, to flow together with ammonia gas, at a temperature of between about 300° C. and about 450° C. over a catalyst capable of splitting off water. As hydroxy fatty acids there may, for instance, be used: ricinoleic acid, hydroxy stearic acid, hydroxy lauric acid, furthermore also dihydoxy fatty acids, for instance dihydroxy stearic acid.

All known catalysts capable of splitting off water may be used for this process, for instance aluminium oxide, thorium oxide, silicagel, or the like. Phosphorous pentoxide and calcium chloride cannot be used for this purpose, because these substances act only in a dehydrating manner and are not catalysts capable of splitting off water.

Hydroxy fatty acids may also be used in mixture with other fatty acids or indifferent solvents or diluents, such as nitriles, hydrocarbons or alcohols. There can thus directly be obtained solutions or mixtures of different nitriles.

It is known that the esters of fatty acids of high molecular weight with univalent alcohols of low molecular weight may be transformed into nitriles by treating the esters with ammonia. It is, however, surprising that hydroxy fatty acids which, as is known, very readily split up at high temperatures can be converted according to the present process into the nitriles of higher unsaturated fatty acids.

The nitriles may be used for various industrial purposes, among others for the preparation of assistants in the textile industry; they may also be used directly or as intermediate products for obtaining substances having long carbon chains, such as higher unsaturated amines.

The following examples serve to illustrate the invention, but they are not intended to limit it thereto:

(1) Commercial ricinoleic acid is passed simultaneously with a current of ammonia at a temperature of 350° C. to 360° C. over silicagel which is contained in an iron tube. From the condensation product obtained it is only necessary to draw off the water formed which separates in the bottom of the apparatus. The nitrile is obtained in a practically quantitative yield; it can be used at once in the form of an oil of a yellowish to brownish color. Any excess of ammonia may be returned to the process.

From 2 kilos of ricinoleic acid there are thus obtained 1550 grams of crude unsaturated nitrile, that is 90 per cent of the theory.

The crude product can be further purified by clearing and filtering it. It consists for the most part of the doubly unsaturated nitrile $C_{18}H_{31}N$, which can be separated by fractional distillation from constituents of low boiling point and of high boiling point. The pure product boils at 220° C. to 225° C. under a pressure of 20 mm. It is a clear scarcely colored oil.

The elementary analysis yields: C 82.57 per cent; H 12.00 per cent; N 5.84 per cent; while for the nitrile $C_{18}H_{31}N$ of the octadecadiene-9,11-acid-1 having the formula

the following figures are calculated: C 82.68 per cent; H 11.96 per cent; N 5.36 per cent.

By hydrogenation with sodium and alcohol the product gives a good yield of the doubly unsaturated amine $C_{18}H_{33}NH_2$ in the form of a colorless oil boiling at 210° C. to 216° C. under a pressure of 20 mm.

(2) It makes no difference as to the course of the reaction, to replace silicagel by vitreous alumina in the reaction described in Example 1. There are obtained without difficulty 200 grams of the same nitrile from 280 grams of commercial ricinoleic acid used.

(3) By substituting for the ricinoleic acid used in Example 1 its glyceride, castor oil, there is obtained in the same manner the nitrile in the form of an oily layer above the aqueous layer in the condensation product. The oily nitrile is subjected to a purification and fractional distillation; the distillate constitutes a good yield and is shown to be the same doubly unsaturated nitrile $C_{18}H_{31}N$ by its identity with the product prepared according to Example 1. The yield amounts to 120 grams of nitrile from 200 grams of castor oil.

(4) Ricinoleic acid methyl ester is passed simultaneously with a current of ammonia over a catalyst of bauxite at a temperature of 350° C. to 370° C. After the water has been separated from the condensation product produced, there is also obtained the doubly unsaturated nitrile $C_{18}H_{31}N$ in a very good yield.

(5) 100 grams of α-hydroxy stearic acid are dissolved by heating them in 200 to 300 grams of a fatty acid nitrile boiling at 140° C. to 150° C. This hot solution is passed in mixture with ammonia gas at 350° C. to 450° C. over a catalyst of silicagel. The condensation product is separated from the water formed and yields when subjected to a fractional distillation 25 grams of an oil boiling at 190° C. to 225° C. under a pressure of 11 mm. The oil obtained is the unsaturated nitrile $C_{17}H_{33}CN$, according to its analysis.

Found: C 82.40 per cent; H 12.71 per cent; N 5.12 per cent.

Calculated: C 82.05 per cent; H 12.63 per cent; N 5.32 per cent.

(6) A warm alcoholic solution of α-hydroxy-stearic acid ethyl ester is conducted in mixture with ammonia gas over a catalyst of silicagel at a temperature of 350° C. to 450° C. After the water has been separated from the condensation product, the same unsaturated nitrile is obtained as in Example 5.

(7) When working in the same manner as described in Example 5, there are obtained from 100 grams of α-hydroxy lauric acid about 20 grams of the corresponding unsaturated nitrile $C_{11}H_{21}CN$ in the form of an oil boiling at 140° C. to 160° C. under a pressure of 11 mm. The analysis yields the following values:

C 81.26 per cent; H 12.54 per cent; N 6.78 per cent, while the calculation of $C_{12}H_{21}N$ yields:

C 80.37 per cent; H 11.81 per cent; N 7.82 per cent.

(8) 100 grams of 9,10-dihydroxy-stearic acid are dissolved in 800 grams of a hot unsaturated fatty acid nitrile boiling at 140° C. to 150° C. The hot solution thus obtained is passed in a current of ammonia at a temperature of between 400° C. and 450° C. over silicagel. After the water has been separated the oily condensation product is subjected to a fractional distillation. The oil boiling at 195° C. to 222° C. under a pressure of 12 mm. is the doubly unsaturated nitrile $C_{17}H_{31}CN$. The yield amounts to 40 grams, that is 50 per cent. of the theory. The analysis of the substance yields:

C 82.09 per cent; H 10.86 per cent; N 5.83 per cent; calculated upon $C_{18}H_{31}N$:

C 82.68 per cent; H 11.96 per cent; N 5.36 per cent.

We claim:

1. The process which comprises conducting an organic compound of the general formula:

$$(R-COO)_x-R_1$$

wherein $x$ stands for the figure 1 or a multiple thereof, R stands for a hydroxylated aliphatic radical of at least ten carbon atoms and $R_1$ stands for hydrogen or an aliphatic radical in case of $x$ being figure 1 or $R_1$ stands for the residue of a polyvalent aliphatic alcohol, x-hydroxyl groups of which being substituted by the acid residue R—COO, together with a current of ammonia gas over a dehydrating catalyst at a temperature of 300° C. to 450° C.

2. The process which comprises conducting a mixture of an indifferent diluent and an organic compound of the general formula:

$$(R-COO)_x-R_1$$

wherein $x$ stands for the figure 1 or a multiple thereof, R stands for a hydroxylated aliphatic radical of at least ten carbon atoms and $R_1$ stands for hydrogen or an aliphatic radical in case of $x$ being figure 1 or $R_1$ stands for the residue of a polyvalent aliphatic alcohol, x-hydroxyl groups of which being substituted by the acid residue R—COO, together with a current of ammonia gas over a dehydrating catalyst at a temperature of 300° C. to 450° C.

3. The process which comprises conducting an organic compound of the general formula:

$$R-COO-R_1$$

wherein R stands for a hydroxylated aliphatic radical of at least ten carbon atoms and $R_1$ stands for hydrogen or an aliphatic radical, together with a current of ammonia gas over a dehydrating catalyst at a temperature of 300° C. to 450° C.

4. The process which comprises conducting a mixture of an indifferent diluent and an organic compound of the general formula:

$$R-COO-R_1$$

wherein R stands for a hydroxylated aliphatic radical of at least ten carbon atoms and $R_1$ stands for hydrogen or an aliphatic radical, together with a current of ammonia gas over a dehydrating catalyst at a temperature of 300° C. to 450° C.

5. The process which comprises conducting an organic compound of the general formula:

$$[CH_3(CH_2)_5CHOH-CH_2-CH=CH(CH_2)_7-COO]_x-R_1$$

wherein $x$ stands for the figure 1 or a multiple thereof, $R_1$ stands for hydrogen or an aliphatic radical in case of $x$ being figure 1 or $R_1$ stands for the residue of a polyvalent aliphatic alcohol, x-hydroxyl groups of which being substituted by the acid residue $$CH_3(CH_2)_5CHOH-CH_2-CH=CH-(CH_2)_7-COO$$

together with a current of ammonia gas over a dehydrating catalyst at a temperature of 300° C. to 450° C.

6. The process which comprises conducting an organic compound of the general formula:

$$CH_3(CH_2)_5CHOH-CH_2-CH=CH(CH_2)_7-COO-R_1$$

wherein $R_1$ stands for hydrogen or an aliphatic radical, together with a current of ammonia gas over a dehydrating catalyst at a temperature of 300° C. to 450° C.

7. The process which comprises conducting ricinoleic acid together with a current of ammonia gas over silicagel at a temperature of about 350° C. to 360° C.

8. The nitrile of the octadecadiene-9,11-acid-1 having the formula $$CH_3(CH_2)_5CH=CH-CH=CH(CH_2)_7-COOH$$

a clear, hardly colored oil boiling at a temperature of 220° C. to 225° C. under a pressure of 20 mm.

OTTO NICODEMUS.
OTTO WULFF.